UNITED STATES PATENT OFFICE.

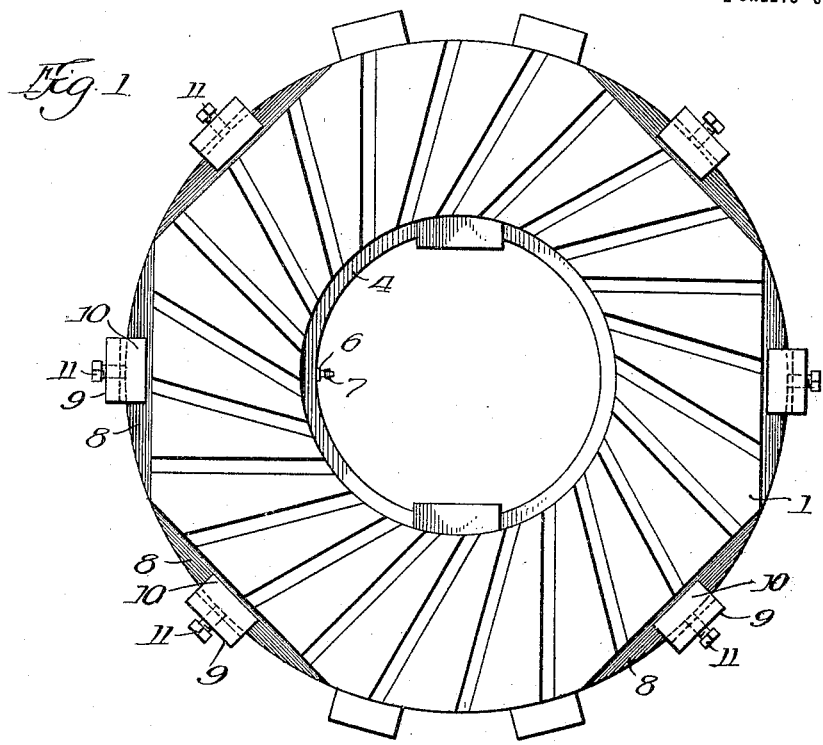
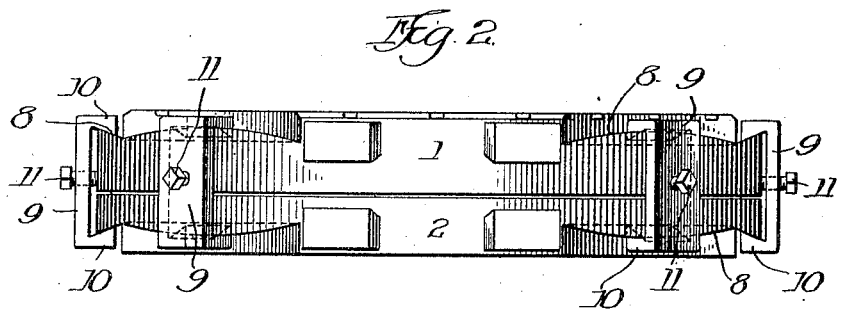

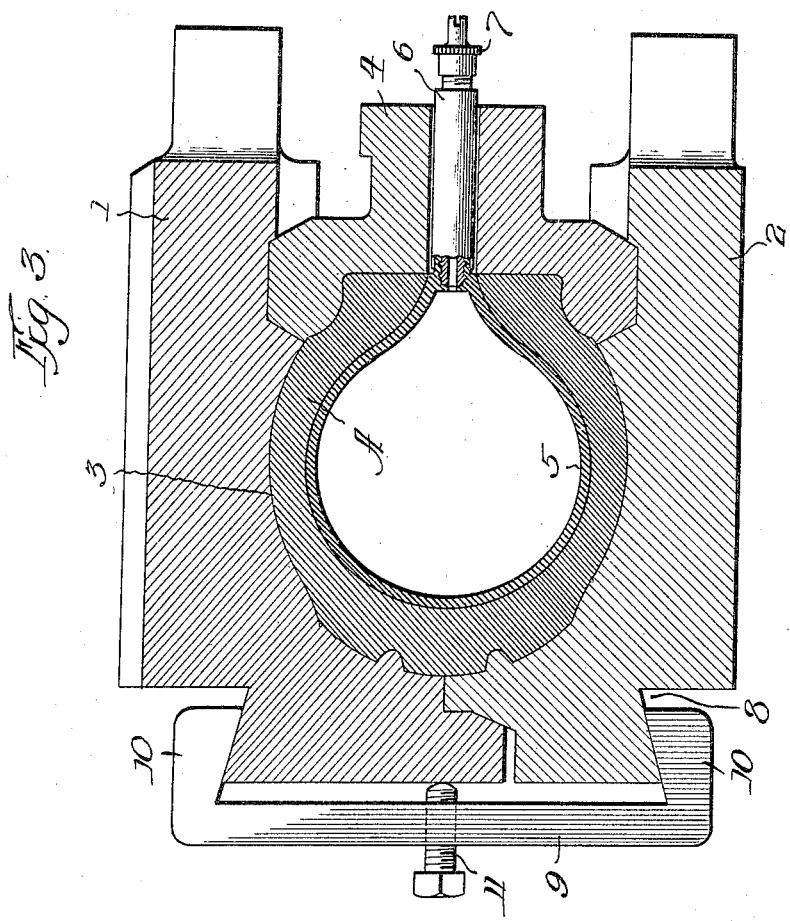

JOHN C. TUTTLE, OF AKRON, OHIO, ASSIGNOR TO THE FIRESTONE TIRE AND RUBBER COMPANY, OF AKRON, OHIO, A CORPORATION OF OHIO.

TIRE-VULCANIZING APPARATUS.

1,402,980.  Specification of Letters Patent.  Patented Jan. 10, 1922.

Application filed February 24, 1919. Serial No. 278,654.

*To all whom it may concern:*

Be it known that I, JOHN C. TUTTLE, a citizen of the United States, residing at Akron, in the county of Summit, State of Ohio, have invented certain new and useful Improvements in Tire-Vulcanizing Apparatus, of which the following is a specification.

The purpose of this invention is to construct an improved form of mold construction which is designed to improve upon the type of apparatus in common use at the present time for curing tires while they are expanded by fluid pressure.

In the apparatus in general use it is customary to connect the interior of the tires in the molds as they are held in the vulcanizer with a source of fluid under pressure, by which the tires are expanded and cured while in expanded condition. This system presents considerable difficulties and disadvantages owing to the extended piping and flexible tubing which is required to connect each mold with the source of fluid pressure, and to the labor attendant upon connecting each tire with an individual flexible pipe. There are other disadvantages which are attendant upon this type of construction to relieve which is the purpose of the present invention.

The present invention consists in providing simple and easily operable clamping devices by which the mold may be held together while pressure is applied to the air bag or interior of the tire before it is placed in the vulcanizer. This form of device renders unnecessary the expensive and unsatisfactory piping for the interior of the vulcanizer as the tire is expanded and the mold held together against the internal pressure before it is placed in the vulcanizer.

These and other objects and advantages will appear as the description proceeds, and it will be understood that I am not limited to the exact form and detail shown herein, but the invention is capable of modification within the scope thereof.

Fig. 1 is a plan view of a mold closed and ready for vulcanization.

Fig. 2 is a side elevation.

Fig. 3 is a vertical section of the assembled tire, mold, and air bag.

The tire mold comprises an upper half 1 and a lower half 2, interiorly of which is formed the tire cavity 3, in which the tire A is vulcanized. Around the lower edges or beads of the tire are located the bead forming rings 4, and inside of the tire is placed the expansible air bag 5 which carries the ordinary air valve 6, which may be provided with a valve cap 7. At a plurality of points about the circumference of the upper and lower halves of the mold are located a plurality of chord like cuts or grooves 8, the bottom surfaces of which are inclined as shown in Fig. 3 so that they converge toward the center of the mold.

Over each pair of registering cuts is arranged to be passed a clamp 9, the central portion of which is vertical and the ends bent at right angles. The inner sides of the arms 10 converge corresponding to the inclination of the cuts 8. The clamps, which may take any form, are preferably in the form of C-clamps as shown, and are designed to hold the molds together while the tire is inflated. Through the central portion of each clamp is threaded a bolt or set screw 11 which bears against the side of the mold and when screwed in draws out the clamp forcing the two halves of the mold tightly together. When the tire is vulcanized, and it is desired to remove it from the mold, the pressure is relieved, the bolts 11 are withdrawn, and the clamps may be slipped out at the sides of the cuts 8.

The exact form of clamps is not essential in the present invention and may be varied and other changes are possible and may be made within the limits of the appended claims.

I claim:

1. An apparatus for vulcanizing tires, comprising a separable mold, an inflatable core in the tire, a valve mechanism carried by the core for maintaining fluid pressure therein, clamps arranged around the mold for holding it together against the pressure in the core, wedging surfaces on the clamps and on the mold and means for moving the clamps to exert wedging action to hold the molds together.

2. An apparatus for vulcanizing tires, comprising a separable mold, an inflatable core in the tire, a valve mechanism carried by the core for maintaining fluid pressure therein, C-clamps arranged about the mold, wedging surfaces on the arms of the clamps, corresponding wedging surfaces on the mold and means for drawing the clamps up on the mold members to exert wedging action in order to hold the molds together.

3. An apparatus for vulcanizing tires, comprising a separable mold, means for inflating a tire in the mold, means for retaining fluid pressure in the tire, C-clamps arranged about the mold, wedging surfaces on the arms of the clamps, the circumference of the mold being provided with grooves arranged as chords about the mold, the surfaces of the grooves being of wedge shape to correspond to the wedging surfaces on the clamps, and means to move the clamps outwardly to exert wedging action on the mold.

4. An apparatus for vulcanizing tires, comprising a separable mold, means for inflating a tire in the mold, means for retaining fluid pressure in the tire, C-clamps arranged about the mold, wedging surfaces on the arms of the clamps, the circumference of the mold being provided with grooves arranged as chords about the mold, the surfaces of the grooves being of wedge shape to correspond to the wedging surfaces on the clamps, and bolts threaded through the central portion of the clamps and arranged to bear at their inner ends against the side of the mold.

5. An apparatus for vulcanizing tires, comprising a separable mold, an expansible core in the tire, a valve mechanism carried by said core, C-clamps arranged about the molds, wedging surfaces on the arms of the clamps, the circumference of the mold being provided with grooves arranged as chords about the mold, the surfaces of the grooves being of wedge shape to correspond to the wedging surfaces on the clamps, and bolts threaded through the central portions of the clamps and arranged to bear at their inner ends against the sides of the mold.

6. An apparatus for vulcanizing tires, comprising a two part mold, an expansible core in the tire, valve mechanism carried by the core, clamps arranged about the mold, said clamps having lateral arms, clamping surfaces on the arms, coacting clamping surfaces on the mold halves, and means to force said clamps outwardly of the mold to force the said clamping surfaces together.

7. An apparatus for vulcanizing tires, comprising a two part mold, an expansible core in the tire, valve mechanism carried by the core, clamps arranged about the mold, said clamps having lateral arms, clamping surfaces on the arms, coacting clamping surfaces on the mold halves, and bolts threaded through the central portion of the clamp and arranged to bear against the side of the mold to force said clamps outwardly of the mold to force the said clamping surfaces together.

8. An apparatus for vulcanizing tires, comprising a two part mold, an expansible core in the tire, valve mechanism carried by the core, clamps arranged about the mold, said clamps having lateral arms, clamping surfaces on said arms, coacting clamping surfaces on the mold halves, and means on said clamps to force the mold halves together.

JOHN C. TUTTLE.